United States Patent
Yanev et al.

(10) Patent No.: US 9,262,064 B2
(45) Date of Patent: Feb. 16, 2016

(54) HANDHELD COMPUTING PLATFORM WITH INTEGRATED PRESSURE SENSOR AND ASSOCIATED METHODS OF USE

(71) Applicant: EZ AS A DRINK PRODUCTIONS, INC., Venice, CA (US)

(72) Inventors: Kostadin Dimitrov Yanev, Alamo, CA (US); Ivo Kostadinov Yanev, Sofia (BG); Angel Georgiev Vassilev, Sofia (BG)

(73) Assignee: EZ AS A DRINK PRODUCTIONS, INC., Reno, NV (US)

( * ) Notice: Subject to any disclaimer, the term of this patent is extended or adjusted under 35 U.S.C. 154(b) by 0 days.

(21) Appl. No.: 13/938,069

(22) Filed: Jul. 9, 2013

(65) Prior Publication Data
US 2015/0015476 A1     Jan. 15, 2015

(51) Int. Cl.
*G09G 5/00* (2006.01)
*G06F 3/0487* (2013.01)

(52) U.S. Cl.
CPC .................................... *G06F 3/0487* (2013.01)

(58) Field of Classification Search
CPC ........................................................... G06F 3/01
USPC ............. 345/156–184, 661; 455/566; 726/19; 715/701; 600/474
See application file for complete search history.

(56) References Cited

U.S. PATENT DOCUMENTS

| 4,577,625 A | 3/1986 | Lohati et al. | 128/57 |
| 4,702,108 A | 10/1987 | Amundsen et al. | 73/379 |

(Continued)

FOREIGN PATENT DOCUMENTS

| CN | 201270095 | 8/2009 |
| EP | 2 284 646 | 2/2011 |

(Continued)

OTHER PUBLICATIONS

Jovanov et al., "A Wireless Body Area Network of Intelligent Motion Sensors for Computer Assisted Physical Rehabilitation", *Journal of NeuroEngineering and Rehabilitation*, Mar. 1, 2005, vol. 2, No. 6, retrieved from URL http://www.jneuroengrehab.com/content/2/1/6, retrieved on Apr. 2, 2012, 10 pages.

(Continued)

*Primary Examiner* — Prabodh M Dharia
(74) *Attorney, Agent, or Firm* — Pillsbury Winthrop Shaw Pittman LLP

(57) ABSTRACT

Receipt of user input may be facilitated using a handheld computing platform with an integrated pressure sensor. Exemplary implementations may allow a user to simply squeeze the handheld computing platform in order to control one or more aspects of operation of the handheld computing platform. That is, instead of tapping a touch screen or pressing buttons, a user may merely need to apply compressive pressure to the handheld computing platform by applying opposing forces to opposing surfaces of the handheld computing platform. By way of non-limiting example, the one or more aspects of operation controlled by squeezing the handheld computing platform may include one or more of input of a value, selection from a menu, manipulation of a virtual object, entry of a password or a code, interaction with a fitness program, interaction with a rehabilitation and/or medical treatment program, interaction with a game, and/or other aspects of operation.

24 Claims, 2 Drawing Sheets

(56) References Cited

U.S. PATENT DOCUMENTS

| | | | | |
|---|---|---|---|---|
| 4,824,103 | A | 4/1989 | Smidt | 272/125 |
| 4,988,981 | A * | 1/1991 | Zimmerman et al. | 345/158 |
| 5,144,284 | A | 9/1992 | Hammett | 340/573 |
| 5,242,348 | A | 9/1993 | Bates | 482/105 |
| 5,471,405 | A | 11/1995 | Marsh | 364/556 |
| 5,702,323 | A | 12/1997 | Poulton | |
| 5,720,711 | A | 2/1998 | Bond et al. | 601/23 |
| 5,790,102 | A | 8/1998 | Nassimi | 345/163 |
| 5,792,080 | A | 8/1998 | Ookawa et al. | 601/115 |
| 5,890,995 | A | 4/1999 | Bobick et al. | 482/4 |
| 5,904,639 | A | 5/1999 | Smyser et al. | 482/91 |
| 5,923,318 | A | 7/1999 | Zhai | |
| 5,982,342 | A * | 11/1999 | Iwata et al. | 345/7 |
| 5,997,489 | A | 12/1999 | Iwamoto et al. | 601/73 |
| 6,013,007 | A | 1/2000 | Root et al. | 482/8 |
| 6,063,045 | A | 5/2000 | Wax | |
| 6,126,572 | A | 10/2000 | Smith | 482/4 |
| 6,183,425 | B1 | 2/2001 | Whalen et al. | 600/592 |
| 6,191,773 | B1 * | 2/2001 | Maruno et al. | 345/158 |
| 6,222,465 | B1 * | 4/2001 | Kumar et al. | 341/20 |
| 6,227,968 | B1 | 5/2001 | Suzuki et al. | 463/7 |
| 6,324,557 | B1 | 11/2001 | Chan | 708/142 |
| 6,359,611 | B2 | 3/2002 | Chan | 345/156 |
| 6,360,597 | B1 | 3/2002 | Hubbard, Jr. | 73/172 |
| 6,405,278 | B1 | 6/2002 | Liepe | 711/103 |
| 6,435,937 | B1 | 8/2002 | Naegele | 446/298 |
| 6,513,532 | B2 | 2/2003 | Mault et al. | 128/921 |
| 6,585,668 | B2 | 7/2003 | Nissim | 601/84 |
| 6,595,901 | B2 | 7/2003 | Reinbold et al. | 482/91 |
| 6,597,347 | B1 | 7/2003 | Yasutake | |
| 6,605,038 | B1 | 8/2003 | Teller et al. | 600/300 |
| 6,616,579 | B1 | 9/2003 | Reinbold et al. | 482/91 |
| 6,662,651 | B1 | 12/2003 | Roth | 73/379.02 |
| 6,675,130 | B2 | 1/2004 | Kanevsky et al. | 702/188 |
| 6,776,345 | B1 | 8/2004 | Liang | 235/486 |
| 6,807,869 | B2 | 10/2004 | Farringdon et al. | 73/862.046 |
| 6,837,827 | B1 | 1/2005 | Lee et al. | 482/8 |
| 6,914,695 | B2 | 7/2005 | Walters et al. | 358/1.15 |
| 6,956,833 | B1 | 10/2005 | Yukie et al. | 370/328 |
| 6,975,644 | B2 | 12/2005 | Tordera et al. | 370/463 |
| 7,026,940 | B2 | 4/2006 | Cherubini | 340/573.1 |
| 7,121,982 | B2 | 10/2006 | Feldman | 482/8 |
| 7,161,490 | B2 | 1/2007 | Huiban | 340/573.1 |
| 7,169,120 | B2 | 1/2007 | Murdock et al. | 601/129 |
| 7,192,387 | B2 | 3/2007 | Mendel | 482/8 |
| 7,229,385 | B2 | 6/2007 | Freeman et al. | 482/4 |
| 7,292,867 | B2 | 11/2007 | Werner et al. | 455/456.3 |
| 7,303,534 | B2 | 12/2007 | Kahn | 600/587 |
| 7,398,151 | B1 | 7/2008 | Burrell et al. | 701/200 |
| 7,429,251 | B2 | 9/2008 | Tanizawa et al. | 601/94 |
| 7,468,968 | B2 | 12/2008 | Svensson et al. | 370/338 |
| 7,480,512 | B2 | 1/2009 | Graham et al. | 455/456.3 |
| 7,499,746 | B2 | 3/2009 | Buhlmann et al. | 607/2 |
| 7,517,327 | B1 | 4/2009 | Knight | 601/46 |
| 7,526,314 | B2 | 4/2009 | Kennedy | 455/556.1 |
| 7,526,954 | B2 | 5/2009 | Haselhurst et al. | 73/172 |
| RE40,891 | E * | 9/2009 | Yasutake | G06F 3/0338 178/18.01 |
| 7,643,895 | B2 | 1/2010 | Gupta et al. | 700/94 |
| 7,666,118 | B1 | 2/2010 | Anthony | 482/8 |
| 7,699,755 | B2 | 4/2010 | Feldman et al. | 482/8 |
| 7,699,757 | B2 | 4/2010 | Clem et al. | 482/49 |
| 7,702,821 | B2 | 4/2010 | Feinberg et al. | 710/13 |
| 7,717,825 | B2 | 5/2010 | Van Der Hoeven | 482/8 |
| 7,758,469 | B2 | 7/2010 | Dyer et al. | 482/4 |
| 7,789,800 | B1 | 9/2010 | Watterson et al. | 482/8 |
| 7,840,346 | B2 | 11/2010 | Huhtala et al. | 701/209 |
| 7,909,741 | B2 | 3/2011 | Kim et al. | 482/93 |
| 7,975,543 | B2 | 7/2011 | Clem et al. | 73/379.02 |
| 8,009,056 | B2 | 8/2011 | Greene | 340/667 |
| 8,025,606 | B2 | 9/2011 | Hamilton | 482/4 |
| 8,027,822 | B2 | 9/2011 | Turgiss et al. | 703/11 |
| 8,172,723 | B1 | 5/2012 | Yanev et al. | 482/8 |
| 8,200,323 | B2 | 6/2012 | DiBenedetto et al. | 600/519 |
| 8,203,454 | B2 | 6/2012 | Knight et al. | 340/573.1 |
| 8,287,434 | B2 | 10/2012 | Zavadsky et al. | 482/5 |
| 8,343,013 | B1 | 1/2013 | Yanev et al. | 482/8 |
| 8,491,446 | B2 | 7/2013 | Hinds et al. | 482/8 |
| 8,618,400 | B2 | 12/2013 | Murphy et al. | 84/600 |
| 8,935,438 | B1 * | 1/2015 | Ivanchenko | 710/16 |
| 2001/0049470 | A1 | 12/2001 | Mault et al. | 600/300 |
| 2002/0146670 | A1 | 10/2002 | Selles et al. | 434/247 |
| 2003/0020629 | A1 | 1/2003 | Swartz et al. | 340/825.25 |
| 2003/0040688 | A1 | 2/2003 | Bauer | 601/23 |
| 2003/0093012 | A1 | 5/2003 | Smyser | |
| 2003/0137495 | A1 * | 7/2003 | Canova, Jr. | 345/173 |
| 2004/0021681 | A1 | 2/2004 | Liao | 345/702 |
| 2004/0058305 | A1 | 3/2004 | Lurie et al. | 434/265 |
| 2004/0110602 | A1 | 6/2004 | Feldman | |
| 2004/0176226 | A1 | 9/2004 | Carlson | |
| 2004/0260215 | A1 | 12/2004 | Kim | 601/99 |
| 2005/0040999 | A1 | 2/2005 | Numano | 345/1.1 |
| 2005/0130742 | A1 | 6/2005 | Feldman et al. | 463/39 |
| 2005/0177054 | A1 | 8/2005 | Yi | |
| 2005/0209049 | A1 | 9/2005 | Shields | 482/8 |
| 2005/0219355 | A1 | 10/2005 | Tahara et al. | 348/14.05 |
| 2005/0283204 | A1 | 12/2005 | Buhlmann | |
| 2006/0035762 | A1 | 2/2006 | Smyser et al. | 482/91 |
| 2006/0064042 | A1 | 3/2006 | Smyser et al. | 600/595 |
| 2006/0100899 | A1 | 5/2006 | Tajima | 705/2 |
| 2006/0122819 | A1 * | 6/2006 | Carmel et al. | 703/21 |
| 2006/0247095 | A1 | 11/2006 | Rummerfield | 482/1 |
| 2007/0015589 | A1 | 1/2007 | Shimizu | |
| 2007/0024736 | A1 | 2/2007 | Matsuda et al. | 348/333.12 |
| 2007/0051842 | A1 | 3/2007 | Pryor | 242/378.3 |
| 2007/0184953 | A1 | 8/2007 | Luberski et al. | 482/146 |
| 2007/0219059 | A1 | 9/2007 | Schwartz et al. | 482/8 |
| 2007/0219469 | A1 | 9/2007 | Vardy | 600/587 |
| 2007/0232455 | A1 | 10/2007 | Hanoun | |
| 2007/0249975 | A1 | 10/2007 | Pan et al. | 601/118 |
| 2007/0270727 | A1 | 11/2007 | KhorassaniZadeh | |
| 2008/0090703 | A1 | 4/2008 | Rosenberg | 492/8 |
| 2008/0091762 | A1 | 4/2008 | Neuhauser et al. | 709/201 |
| 2008/0096726 | A1 | 4/2008 | Riley et al. | 482/8 |
| 2008/0100718 | A1 | 5/2008 | Louks et al. | 348/211.2 |
| 2008/0101272 | A1 | 5/2008 | Hayes et al. | 370/313 |
| 2008/0132388 | A1 | 6/2008 | Clem | |
| 2008/0146336 | A1 | 6/2008 | Feldman et al. | 463/37 |
| 2008/0161051 | A1 | 7/2008 | Schobbert et al. | 455/558 |
| 2008/0171311 | A1 | 7/2008 | Centen et al. | 434/265 |
| 2008/0261696 | A1 | 10/2008 | Yamazaki et al. | 463/39 |
| 2008/0262918 | A1 | 10/2008 | Wiener | 705/14 |
| 2008/0281234 | A1 | 11/2008 | Goris | |
| 2008/0287832 | A1 | 11/2008 | Collins et al. | 600/587 |
| 2008/0300055 | A1 * | 12/2008 | Lutnick | G07F 17/3209 463/39 |
| 2009/0017993 | A1 | 1/2009 | Khanicheh et al. | 482/49 |
| 2009/0025475 | A1 | 1/2009 | DeBeliso et al. | 73/379.02 |
| 2009/0035740 | A1 | 2/2009 | Reed et al. | 434/265 |
| 2009/0048021 | A1 | 2/2009 | Lian et al. | 463/37 |
| 2009/0048070 | A1 | 2/2009 | Vincent et al. | 482/8 |
| 2009/0069160 | A1 | 3/2009 | Summers | 482/91 |
| 2009/0076855 | A1 | 3/2009 | McCord | 705/3 |
| 2009/0144080 | A1 | 6/2009 | Gray et al. | 705/2 |
| 2009/0148821 | A1 | 6/2009 | Carkner et al. | 434/265 |
| 2009/0228068 | A1 | 9/2009 | Buhlmann et al. | 607/48 |
| 2009/0286654 | A1 | 11/2009 | Rice | 482/4 |
| 2010/0021876 | A1 | 1/2010 | Clash | 434/265 |
| 2010/0056341 | A1 | 3/2010 | Ellis et al. | 482/9 |
| 2010/0069148 | A1 | 3/2010 | Cargill | 463/25 |
| 2010/0087763 | A1 | 4/2010 | Hane-Karr | 601/137 |
| 2010/0127983 | A1 * | 5/2010 | Irani et al. | 345/163 |
| 2010/0137105 | A1 | 6/2010 | McLaughlin | 482/8 |
| 2010/0178981 | A1 | 7/2010 | Holcomb et al. | 463/37 |
| 2010/0197462 | A1 | 8/2010 | Piane, Jr. | 482/5 |
| 2010/0245239 | A1 | 9/2010 | Sternberg | 345/156 |
| 2010/0248822 | A1 | 9/2010 | Migos et al. | 463/29 |
| 2010/0255862 | A1 | 10/2010 | Mitsunaga et al. | 455/466 |
| 2010/0255957 | A1 | 10/2010 | Clem et al. | 482/49 |
| 2010/0259472 | A1 * | 10/2010 | Radivojevic et al. | 345/156 |
| 2010/0265179 | A1 | 10/2010 | Ram | 345/163 |
| 2010/0273610 | A1 | 10/2010 | Johnson | 482/9 |
| 2010/0292050 | A1 | 11/2010 | DiBenedetto et al. | 482/9 |
| 2010/0292600 | A1 | 11/2010 | DiBenedetto et al. | 600/520 |

(56) References Cited

U.S. PATENT DOCUMENTS

| | | | |
|---|---|---|---|
| 2011/0035303 A1 | 2/2011 | Jakstadt et al. | 705/34 |
| 2011/0046687 A1 | 2/2011 | Naschberger | 607/3 |
| 2011/0086747 A1 | 4/2011 | Broderick | 482/142 |
| 2011/0124470 A1 | 5/2011 | Spurling et al. | 482/13 |
| 2011/0125866 A1 | 5/2011 | Williams | 709/217 |
| 2011/0143769 A1 | 6/2011 | Jones et al. | 455/456.1 |
| 2011/0165998 A1 | 7/2011 | Lau et al. | 482/8 |
| 2011/0187660 A1 | 8/2011 | Hirata et al. | 345/173 |
| 2011/0251021 A1 | 10/2011 | Zavadsky et al. | 482/5 |
| 2011/0260987 A1 | 10/2011 | Zhao et al. | 345/173 |
| 2011/0291943 A1 | 12/2011 | Thorn et al. | 345/173 |
| 2011/0302694 A1 | 12/2011 | Wang et al. | 2/160 |
| 2012/0047465 A1* | 2/2012 | Noda et al. | 715/848 |
| 2012/0051596 A1* | 3/2012 | Darnell et al. | 382/103 |
| 2012/0058861 A1 | 3/2012 | Satut | 482/8 |
| 2012/0066591 A1 | 3/2012 | Hackwell | 715/702 |
| 2012/0071732 A1 | 3/2012 | Grey et al. | 600/301 |
| 2012/0075236 A1 | 3/2012 | Kim et al. | 345/174 |
| 2012/0077163 A1 | 3/2012 | SucarSuccar | |
| 2012/0078113 A1* | 3/2012 | Whitestone et al. | 600/474 |
| 2012/0088553 A1* | 4/2012 | Nunes | 455/566 |
| 2012/0098744 A1* | 4/2012 | Stinson, III | 345/158 |
| 2012/0108394 A1 | 5/2012 | Jones et al. | 482/8 |
| 2012/0112922 A1 | 5/2012 | Hillis et al. | 340/657 |
| 2012/0113019 A1 | 5/2012 | Anderson | 345/173 |
| 2012/0116550 A1 | 5/2012 | Hoffman et al. | 700/91 |
| 2012/0126941 A1 | 5/2012 | Coggill | 340/5.54 |
| 2012/0150074 A1 | 6/2012 | Yanev et al. | 600/587 |
| 2012/0162080 A1 | 6/2012 | Cao | 345/168 |
| 2012/0260220 A1* | 10/2012 | Griffin | 715/863 |
| 2012/0265112 A1 | 10/2012 | Chen | 601/115 |
| 2012/0274508 A1* | 11/2012 | Brown | G04F 10/00 342/357.25 |
| 2012/0306782 A1 | 12/2012 | Seo et al. | 345/173 |
| 2013/0009907 A1* | 1/2013 | Rosenberg et al. | 345/174 |
| 2013/0059696 A1 | 3/2013 | Hijmans et al. | 482/8 |
| 2013/0072301 A1 | 3/2013 | Mallinson | |
| 2013/0076649 A1 | 3/2013 | Myers et al. | 345/173 |
| 2013/0093679 A1 | 4/2013 | Dickinson et al. | 345/168 |
| 2013/0106155 A1 | 5/2013 | Chang | 297/217.3 |
| 2013/0127748 A1* | 5/2013 | Vertegaal et al. | 345/173 |
| 2013/0127980 A1* | 5/2013 | Haddick | G06F 3/013 348/14.08 |
| 2013/0201316 A1* | 8/2013 | Binder | H04L 67/12 348/77 |
| 2013/0212674 A1 | 8/2013 | Boger | |
| 2013/0337974 A1 | 12/2013 | Yanev et al. | 482/8 |
| 2013/0337975 A1 | 12/2013 | Yanev et al. | 482/8 |
| 2013/0337976 A1 | 12/2013 | Yanev et al. | 482/8 |
| 2013/0344919 A1* | 12/2013 | Kim et al. | 455/566 |
| 2013/0345608 A1 | 12/2013 | Ehrenreich | |
| 2014/0062682 A1* | 3/2014 | Birnbaum | G08B 6/00 340/407.2 |
| 2014/0123003 A1* | 5/2014 | Song | 715/701 |
| 2014/0184496 A1* | 7/2014 | Gribetz | G02B 27/017 345/156 |
| 2014/0317722 A1* | 10/2014 | Tartz et al. | 726/19 |
| 2014/0333543 A1 | 11/2014 | Yanev et al. | 345/173 |
| 2014/0335494 A1 | 11/2014 | Yanev et al. | 434/262 |
| 2015/0173993 A1* | 6/2015 | Walsh | A61H 3/00 414/4 |

FOREIGN PATENT DOCUMENTS

| | | |
|---|---|---|
| JP | 2013/172841 | 9/2013 |
| TW | 509566 | 1/1988 |
| TW | 201000175 A | 1/2010 |
| TW | 201300098 | 1/2013 |
| TW | 201301215 | 1/2013 |
| WO | WO 2007/025382 | 3/2007 |
| WO | WO 2012/078718 | 6/2012 |
| WO | WO 2013/192071 | 12/2013 |
| WO | WO 2013/192079 | 12/2013 |
| WO | WO 2013/192084 | 12/2013 |
| WO | 2014018049 | 1/2014 |
| WO | WO 2014/182729 | 11/2014 |
| WO | WO 2014/182735 | 11/2014 |
| WO | WO 2015/006411 | 1/2015 |
| WO | WO 2015/006413 | 1/2015 |

OTHER PUBLICATIONS

Halfbakery, "Computer Mouse with Pressure Sensitive Button", printed from http://www.halfbakery.com/idea/Computer_20Mouse_20with_20pressure..., Cord, May 10, 2005, printed Apr. 4, 2014, 3 pages.

International Search Report and Written Opinion mailed Apr. 20, 2012 for corresponding International Patent Application No. PCT/US2011/063678 (7 pages).

International Search Report and Written Opinion mailed Oct. 1, 2013 for corresponding International Patent Application No. PCT/US2013/046096 (10 pages).

International Search Report and Written Opinion mailed Oct. 2, 2013 for corresponding International Patent Application No. PCT/US2013/046118 (10 pages).

International Search Report and Written Opinion mailed Nov. 22, 2013 for corresponding International Patent Application No. PCT/US2013/046082 (7 pages).

International Search Report and Written Opinion mailed Nov. 7, 2014 for corresponding International Patent Application No. PCT/US2014/045899 (7 pages).

International Search Report and Written Opinion mailed Mar. 4, 2015 for corresponding International Patent Application No. PCT/US2014/037018, 9 pages.

International Search Report and Written Opinion mailed Mar. 13, 2015 for corresponding International Patent Application No. PCT/US2014/037012, 9 pages.

* cited by examiner

HANDHELD COMPUTING PLATFORM WITH INTEGRATED PRESSURE SENSOR AND ASSOCIATED METHODS OF USE

FIELD OF THE DISCLOSURE

This disclosure relates to systems and methods associated with a handheld computing platform with an integrated pressure sensor to facilitate receipt of user input.

BACKGROUND

Handheld computing platforms continue to gain popularity in the marketplace. Examples of these platforms may include Smartphones, handheld computers, handheld gaming consoles, handheld exercise devices, and/or other handheld computing platforms. User interactions with existing handheld computing platforms, particularly with respect to input, is typically limited to using buttons, touchscreens, and/or voice commands.

SUMMARY

One aspect of the disclosure relates to a system configured to facilitate receipt of user input using a handheld computing platform with an integrated pressure sensor, in accordance with one or more implementations. Exemplary implementations may allow a user to simply squeeze the handheld computing platform in order to control one or more aspects of operation the handheld computing platform. That is, instead of tapping a touch screen or pressing buttons, a user may merely need to apply compressive pressure to the handheld computing platform by applying opposing forces to opposing surfaces of the handheld computing platform. By way of non-limiting example, the one or more aspects of operation controlled by squeezing the handheld computing platform may include one or more of input of a value, selection from a menu, manipulation of a virtual object, entry of a password or a code, interaction with a fitness program, interaction with a rehabilitation program, interaction with a medical treatment program, interaction with a game, and/or other aspects of operation.

The handheld computing platform may comprise a housing body. The housing body may be configured to house components of the handheld computing platform. The pressure sensor may be disposed within the housing body. The pressure sensor may be configured to provide a pressure signal conveying information associated with a compressive pressure applied to the housing body. The pressure signal may be provided responsive to the housing body being squeezed by two opposing forces applied to opposing surfaces of the housing body. By way of non-limiting example, one of the opposing forces may be provided by a body part of a user (e.g., finger, hand, knee, and/or other body parts), a fixed surface (e.g., a tabletop, a doorway, and/or other fixed surface), an accessory (e.g., a strap, a stick, and/or other accessory), and/or other objects.

In some implementations, the handheld computing platform may include a display, one or more buttons, and/or other components. The display may be disposed within the housing body. In implementations where the display comprises a touchscreen, touch functionality may be configured to be disabled to avoid confusion between touch-based input and squeeze-based input. According to some implementations, compressive pressure may be required to breach a threshold magnitude for the pressure signal to be provided by the pressure sensor to avoid confusion between touch-based input and squeeze-based input, and/or to avoid inadvertent squeeze-based input.

The button(s) may be disposed within holes in the housing body. Individual ones of button(s) may be configured to facilitate user input responsive to being depressed. Examples of button(s) may include one or more of a power button, a volume button, and/or other buttons. According to some implementations, a squeeze-based input may override a button-based input to avoid confusion between button-based input and squeeze-based input.

The handheld computing platform may be configured to execute one or more computer program modules. The computer program modules may include one or more of a squeeze interpretation module, a compressive pressure quantification module, and/or other modules.

The squeeze interpretation module may be configured to receive the pressure signal provided by the pressure sensor. The squeeze interpretation module may be configured to interpret the pressure signal to control one or more aspects of operation the handheld computing platform. The one or more aspects of operation of the handheld computing platform may include one or more of input of a value, selection from a menu, manipulation of a virtual object, entry of a password or a code, interaction with a fitness program, interaction with a rehabilitation program, interaction with a medical treatment program, interaction with a game, and/or other aspects of operation. It will be appreciated that the various interactions listed above may include interactions that involve a user interface of the handheld computing platform, and/or interactions that do not involve interactions with a user interface. Examples of a user interface may include a display, a touchscreen, a speaker, and/or other interfaces configured to receive information from and/or provide information to a user.

A value inputted based on the pressure signal may be an analog value or a digital value. Digital values having very fine granularity may be interpreted by a user as quasi-analog input. By way of non-limiting example, a user may squeeze the handheld computing platform with varying forces in order to enter a value on a quasi-analog meter presented on the display where smaller forces correspond to smaller values on the meter and larger forces correspond to larger values on the meter. As another example, a user may enter a height of the user in a text field presented on the display where smaller forces correspond to shorter heights and larger forces correspond to taller heights.

Entry of a password or code based on the pressure signal may be achieved by a sequence of squeezes performed on the handheld computing platform. For example, a user may perform different magnitudes and/or different durations of squeezes on the handheld computing platform. To illustrate, a user may perform a specific combination of short and long squeezes on the handheld computing platform as a password. Combinations of squeezes on different locations of the handheld computing platform may be used as a password, according to some implementations.

Manipulation of a virtual object based on the pressure signal may be further based on an accelerometer signal conveying a position and/or a change in position of the handheld computing platform. For example, a virtual object may be "grasped" by squeezing the handheld computing platform. The position of the virtual object may be controlled through corresponding a position and/or a change in position of the handheld computing platform. The accelerometer signal may be provided by an accelerometer (not depicted) and/or other position detection device included in the handheld computing platform. In one implementation, exertion and release of pressure may respectively result in zoom-in and zoom-out of a three-dimensional virtual space.

A fitness program may include squeezing the handheld computing platform. This may be used during isometric and/or dynamic exercise routines. The fitness program may include squeezing the handheld computing platform with a threshold force, for a threshold duration of time, for a number of repetitions, and/or other exercise metrics.

The squeeze interpretation module may be configured to receive multiple contemporaneous pressure signals provided by the pressure sensor. The squeeze interpretation module may be configured to interpret the multiple contemporaneous pressure signals to control one or more aspects of operation of the handheld computing platform.

The squeeze interpretation module may be configured to interpret the pressure signal to control one or more aspects of operation of the handheld computing platform based on a position on the handheld computing platform on which the opposing forces were applied. By way of non-limiting example, squeezing front and rear surfaces of the handheld computing platform may correspond to one input, while squeezing top and bottom surfaces of the handheld computing platform may correspond to another input.

The compressive pressure quantification module may be configured to quantify the compressive pressure applied to the housing body. The compressive pressure quantification module may be configured to quantify the compressive pressure applied to the housing body on an arbitrary scale such as a scale between one and ten, a scale between one and five stars, and/or other arbitrary scale. The compressive pressure quantification module may be configured to quantify the compressive pressure or force (or other suitable metric) applied to the housing body in absolute units such as pounds (lb), kilograms (kg), Newtons (N), pounds per square inch (PSI), Pascals (Pa), Newtons per meters squared (N/m$^2$), and/or other absolute units.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
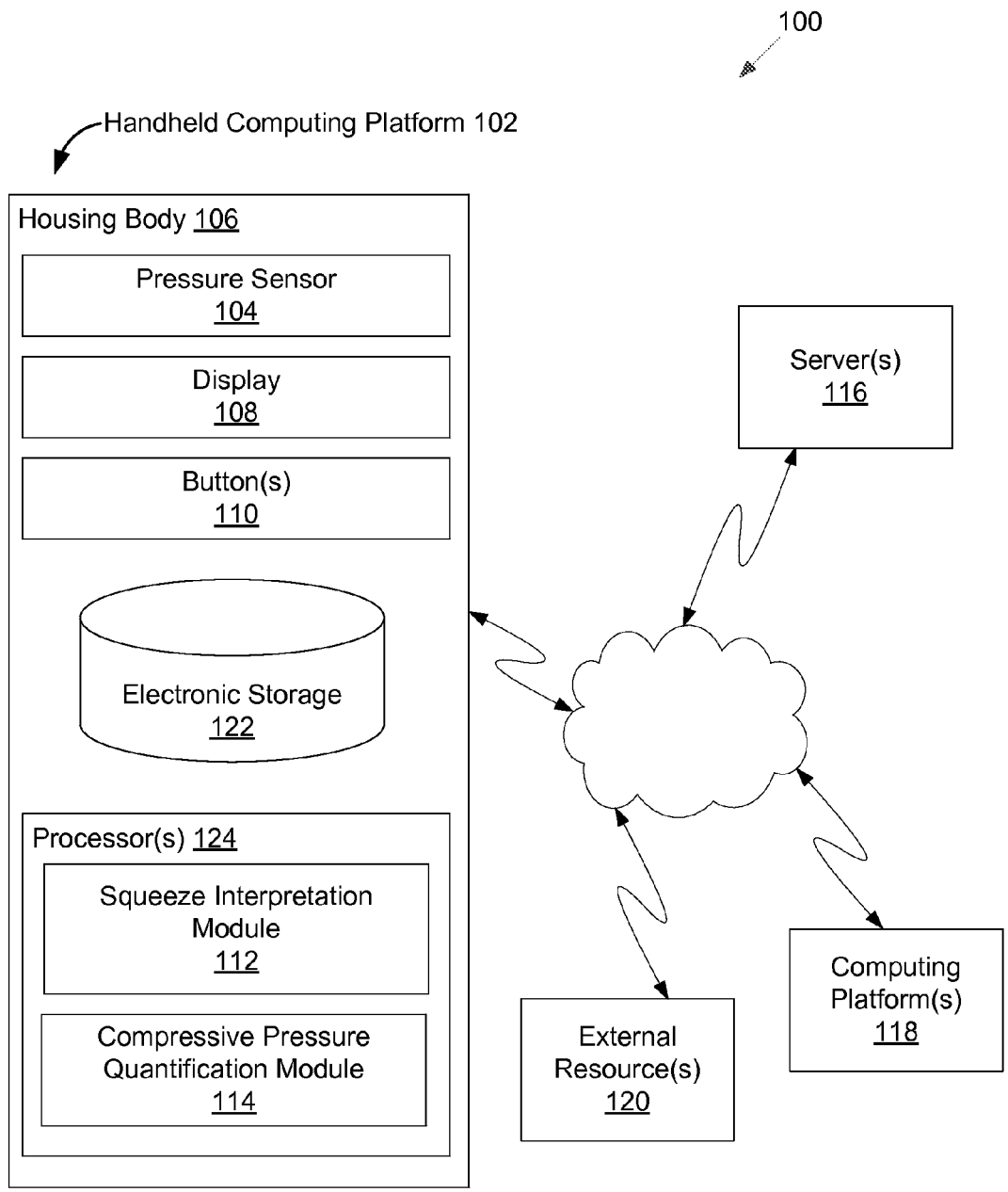
FIG. 1 illustrates a system configured to facilitate receipt of user input using a handheld computing platform with an integrated pressure sensor, in accordance with one or more implementations.

FIG. 1 illustrates a system 100 configured to facilitate receipt of user input using a handheld computing platform 102 with an integrated pressure sensor 104, in accordance with one or more implementations. Exemplary implementations may allow a user to simply squeeze handheld computing platform 102 in order to control one or more aspects of operation handheld computing platform 102. That is, instead of tapping a touch screen or pressing buttons, a user may merely need to apply compressive pressure to handheld computing platform 102 by applying opposing forces to opposing surfaces of handheld computing platform 102. By way of non-limiting example, the one or more aspects of operation controlled by squeezing handheld computing platform 102 may include one or more of input of a value, selection from a menu, manipulation of a virtual object, entry of a password or a code, interaction with a fitness program, interaction with a rehabilitation program, interaction with a medical treatment program, interaction with a game, and/or other aspects of operation.

The handheld computing platform 102 may comprise a housing body 106. The housing body 106 may be configured to house components of handheld computing platform 102. The housing body 106 may form a shell that encloses components of handheld computing platform 102. The housing body 106 may be a unitary body or may be comprised on two or more pieces that are joined together to form housing body 106. The housing body 106 may be made of one or more materials such as a plastic and/or other durable, semi-rigid materials suitable to form outer surfaces of handheld computing platforms. At least a portion of housing body 106 may be opaque, translucent, and/or transparent. In some implementations, handheld computing platform 102 may include more than one housing body, such as disclosed in U.S. patent application Ser. No. 13/527,465 filed on Jun. 19, 2012 and entitled "Personal Wellness Device," which is incorporated herein by reference. The multiple housing bodies may be configured to provide an open and closed configuration (e.g., the common "clamshell" design). Compressive pressure may be applied to such implementations in the closed configuration.

The pressure sensor 104 may be disposed within housing body 106. The pressure sensor 104 may be configured to provide a pressure signal conveying information associated with a compressive pressure applied to housing body 106. By way of non-limiting example, pressure sensor 104 may comprise a stress gauge configured to facilitate measuring stress undergone by housing body 106, a deflection gauge configured to facilitate measuring a deflection undergone by housing body 106, and/or other devices suitable for facilitating pressure measurements. In some implementations, handheld computing platform 102 may include two or more pressure sensors that are the same as or similar to pressure sensor 104. The two or more pressure sensors may provide separate pressure signals, or the two or more pressure sensors may provide signals that are combined into a single pressure signal.

The pressure signal may be provided responsive to housing body 106 being squeezed by two opposing forces applied to opposing surfaces of housing body 106. The opposing forces may be applied by a user's hand, a user's other body parts, and/or other objects capable of applying pressure. In some implementations, handheld computing platform 102 may be configured to be removably coupled with an accessory (not depicted). The accessory may be configured to facilitate squeezing housing body 106 by two opposing forces applied to opposing surfaces of housing body 106. The accessory may include a strap, an elastic band, a stick, and/or other accessories. The accessory may include a device configured to adapt handheld computing platform 102 to operate as a weight scale. For example, such an accessory may include a form factor similar to a bathroom scale that has a recessed area into which handheld computing platform 102 may be removably disposed.

Examples of opposing surfaces may include a front surface and a rear surface, a top surface and a bottom surface, a left surface and a right surface, diagonally opposing surfaces, and/or other opposing surfaces of handheld computing platform 102. In some implementations, the two opposing forces may be applied to any opposing surfaces of housing body 106. Squeezing housing body 106 by two opposing forces applied to opposing surfaces of housing body 106 does not include tapping and/or dragging on a touchscreen, pressing buttons, or other input methods that merely require force in one direction instead of two opposing forces applied to two opposing surfaces. Opposing forces may be applied to entire opposing surfaces and/or portions of opposing surfaces. For example, a user may squeeze handheld computing platform 102 using two opposing palms that cover entire opposing surfaces. As another example, a user may squeeze handheld computing platform 102 using a thumb and index finger that contact portions of opposing surfaces.

In some implementations, pressure sensor 104 may be configured to provide multiple pressure signals conveying information associated with multiple pressures applied to housing body 106. Individual ones of the multiple pressure signals may be provided responsive to housing body 106 being squeezed multiple pairs of opposing forces applied to multiple sets of opposing surfaces of housing body 106.

In some implementations, handheld computing platform 102 may include a display 108, one or more buttons 110, and/or other components. The display 108 disposed within housing body 106. The display 108 may be configured to present visual information. The display 108 may be visible through a transparent portion of housing body 106. The display 108 may comprise a touchscreen, an LCD display, and/or other display apparatus. In implementations where display 108 comprises a touchscreen, touch functionality may be configured to be disabled to avoid confusion between touch-based input and squeeze-based input. According to some implementations, compressive pressure may be required to breach a threshold magnitude for the pressure signal to be provided by pressure sensor 104 to avoid confusion between touch-based input and squeeze-based input, and/or to avoid inadvertent squeeze-based input.

The button(s) 110 may be disposed within holes in housing body 106. Individual ones of button(s) 110 may be configured to facilitate user input responsive to being depressed. Examples of button(s) 110 may include one or more of a power button, a volume button, and/or other buttons. According to some implementations, a squeeze-based input may override a button-based input to avoid confusion between button-based input and squeeze-based input.

The handheld computing platform 102 may be configured to execute one or more computer program modules. The computer program modules may include one or more of a squeeze interpretation module 112, a compressive pressure quantification module 114, and/or other modules.

The squeeze interpretation module 112 may be configured to receive the pressure signal provided by pressure sensor 104. The squeeze interpretation module 112 may be configured to interpret the pressure signal to control one or more aspects of operation handheld computing platform 102. The one or more aspects of operation of handheld computing platform 102 may include one or more of input of a value, selection from a menu, manipulation of a virtual object, entry of a password or a code, interaction with a fitness program, interaction with a rehabilitation program, interaction with a medical treatment program, interaction with a game, and/or other aspects of operation. It will be appreciated that the various interactions listed above may include interactions that involve a user interface (not depicted) of the handheld computing platform, and/or interactions that do not involve interactions with a user interface. Examples of a user interface may include a display, a touchscreen, a speaker, and/or other interfaces configured to receive information from and/or provide information to a user.

A value inputted based on the pressure signal may be an analog value or a digital value. Digital values having very fine granularity may be interpreted by a user as quasi-analog input. By way of non-limiting example, a user may squeeze handheld computing platform 102 with varying forces in order to enter a value on a quasi-analog meter presented on display 108 where smaller forces correspond to smaller values on the meter and larger forces correspond to larger values on the meter. As another example, a user may enter a height of the user in a text field presented on display 108 where smaller forces correspond to shorter heights and larger forces correspond to taller heights.

Entry of a password or code based on the pressure signal may be achieved by a sequence of squeezes performed on handheld computing platform 102. For example, a user may perform different magnitudes and/or different durations of squeezes on handheld computing platform 102. To illustrate, a user may perform a specific combination of short and long squeezes on handheld computing platform 102 as a password. Combinations of squeezes on different locations of handheld computing platform 102 may be used as a password, according to some implementations.

Manipulation of a virtual object based on the pressure signal may be further based on an accelerometer signal conveying a position and/or a change in position of handheld computing platform 102. For example, a virtual object may be "grasped" by squeezing handheld computing platform 102. The position of the virtual object may be controlled through corresponding a position and/or a change in position of handheld computing platform 102. The accelerometer signal may be provided by an accelerometer (not depicted) and/or other position detection device included in handheld computing platform 102. In one implementation, exertion and release of pressure may respectively result in zoom-in and zoom-out of a three-dimensional virtual space.

A fitness program may include squeezing handheld computing platform 102. This may be used during isometric and/or dynamic exercise routines. The fitness program may include squeezing handheld computing platform 102 with a threshold force, for a threshold duration of time, for a number of repetitions, and/or other exercise metrics. According to some implementations, the fitness program may include squeezing handheld computing platform 102 to achieve a variable target force over time. For example, a graphical indication, audible indication, and/or other indication may convey to a user when the force applied is above or below a target force. The target force may change over time, according to a fitness program. The target force may change responsive to the applied force equaling the target force.

The squeeze interpretation module 112 may be configured to receive multiple contemporaneous pressure signals provided by pressure sensor 104. The squeeze interpretation module 112 may be configured to interpret the multiple contemporaneous pressure signals to control one or more aspects of operation of the handheld computing platform.

The squeeze interpretation module 112 may be configured to interpret the pressure signal to control one or more aspects of operation of handheld computing platform 102 based on a position on handheld computing platform 102 on which the opposing forces were applied. By way of non-limiting example, squeezing front and rear surfaces of handheld computing platform 102 may correspond to one input, while squeezing top and bottom surfaces of handheld computing platform 102 may correspond to another input.

The compressive pressure quantification module 114 may be configured to quantify the compressive pressure applied to housing body 106. The compressive pressure quantification module 114 may be configured to quantify the compressive pressure applied to housing body 106 on an arbitrary scale such as a scale between one and ten, a scale between one and five stars, and/or other arbitrary scale. The compressive pressure quantification module 114 may be configured to quantify the compressive pressure or force (or other suitable metric) applied to housing body 106 in absolute units such as pounds (lb), kilograms (kg), Newtons (N), pounds per square inch (PSI), Pascals (Pa), Newtons per meters squared (N/m$^2$), and/or other absolute units.

In some implementations, handheld computing platform 102 may be configured to communication with one or more computing platforms (e.g., one or more servers 116 and/or one or more computing platforms 118) according to a client/server architecture and/or a peer-to-peer architecture. The handheld computing platform 102, server(s) 116, computing platform(s) 118, and/or one or more external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which handheld computing platform 102, server(s) 116, computing platform(s) 118, and/or external resource(s) 120 may be operatively linked via some other communication media.

In some implementations, a given computing platform 118 may be the same as or similar to handheld computing platform 102. A given server 116 and/or a given computing platform 118 may include one or more processors configured to execute computer program modules. The computer program modules may be configured to enable an expert or user associated with the given server 116 and/or the given computing platform 118 to interface with system 100 and/or external resource(s) 120, and/or provide other functionality attributed herein to server(s) 116 and/or computing platform(s) 118. In some implementations, one or more functions attributed herein handheld computing platform 102 may be performed by server(s) 116 and/or computing platform(s) 118. By way of non-limiting example, the given computing platform 118 may include one or more of a desktop computer, a laptop computer, a handheld computer, a tablet computing platform, a NetBook, a Smartphone, a gaming console, and/or other computing platforms.

External resource(s) 120 may include sources of information, external entities participating with system 100, and/or other resources. In some implementations, some or all of the functionality attributed herein to external resource(s) 120 may be provided by resources included in system 100.

The handheld computing platform 102 may include electronic storage 122, one or more processors 124, and/or other components. The handheld computing platform 102 may include communication lines, or ports to enable the exchange of information with a network and/or other computing platforms. Illustration of handheld computing platform 102 in FIG. 1 is not intended to be limiting. The handheld computing platform 102 may include a plurality of hardware, software, and/or firmware components operating together to provide the functionality attributed herein to handheld computing platform 102.

Electronic storage 122 may comprise non-transitory storage media that electronically stores information. The electronic storage media of electronic storage 122 may include one or both of system storage that is provided integrally (i.e., substantially non-removable) with handheld computing platform 102 and/or removable storage that is removably connectable to handheld computing platform 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from handheld computing platform 102, information received from server(s) 116, information received from computing platform(s) 118, and/or other information that enables handheld computing platform 102 to function as described herein.

The processors(s) 124 may be configured to provide information processing capabilities in handheld computing platform 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute modules 112, 114, and/or other modules. The processor(s) 124 may be configured to execute modules 112, 114, and/or other modules by software; hardware; firmware; some combination of software, hardware, and/or firmware; and/or other mechanisms for configuring processing capabilities on processor(s) 124. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 112 and 114 are illustrated in FIG. 1 as being implemented within a single processing unit, in implementations in which processor(s) 124 includes multiple processing units, one or more of modules 112 and/or 114 may be implemented remotely from the other modules. The description of the functionality provided by the different modules 112 and/or 114 described below is for illustrative purposes, and is not intended to be limiting, as any of modules 112 and/or 114 may provide more or less functionality than is described. For example, one or more of modules 112 and/or 114 may be eliminated, and some or all of its functionality may be provided by other ones of modules 112 and/or 114. As another example, processor(s) 124 may be configured to execute one or more additional modules that may perform some or all of the functionality attributed below to one of modules 112 and/or 114.

Figure 2:
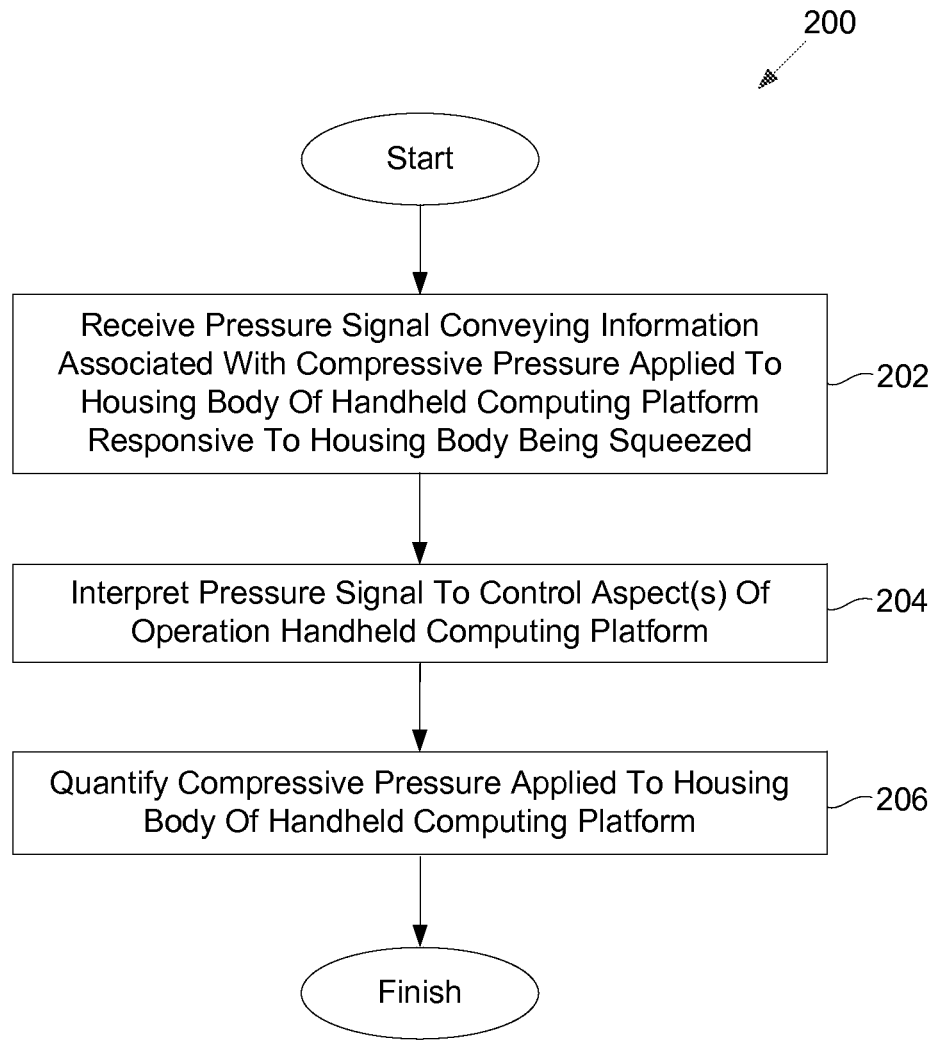
FIG. 2 illustrates a method of facilitating receipt of user input using a handheld computing platform with an integrated pressure sensor, in accordance with one or more implementations.

FIG. 2 illustrates a method 200 of facilitating receipt of user input using a handheld computing platform with an integrated pressure sensor, in accordance with one or more implementations. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a pressure signal conveying information associated with a compressive pressure applied to a housing body (e.g., housing body 106) of a handheld computing platform (e.g., handheld computing platform 102) may be received. The pressure signal may be provided by a pressure sensor (e.g., pressure sensor 104) disposed within the housing body. The pressure signal may be provided responsive to the housing body being squeezed by two opposing forces applied to opposing surfaces of the housing body. Operation 202 may be performed by one or more processors configured to execute a squeeze interpretation module that is the same as or similar to squeeze interpretation module 112, in accordance with one or more implementations.

At an operation 204, the pressure signal may be interpreted to control one or more aspects of operation of the handheld computing platform. In some implementations, the one or more aspects of operation of the handheld computing platform may include one or more of input of a value, selection from a menu, manipulation of a virtual object, entry of a password or a code, interaction with a fitness program, interaction with a rehabilitation program, interaction with a medical treatment program, interaction with a game, and/or other aspects of operation. Operation 204 may be performed by one or more processors configured to execute a squeeze interpretation module that is the same as or similar to squeeze interpretation module 112, in accordance with one or more implementations.

At an operation 206, the compressive pressure applied to the housing body may be quantified. Operation 206 may be performed by one or more processors configured to execute a compressive pressure quantification module that is the same as or similar to compressive pressure quantification module 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A handheld computing platform with an integrated pressure sensor to facilitate receipt of user input, the handheld computing platform comprising:

a housing body configured to house components of the handheld computing platform;

a pressure sensor disposed within the housing body, the pressure sensor being configured to provide a pressure signal conveying information associated with a compressive pressure applied to the housing body, the pressure signal being provided responsive to the housing body being squeezed by two opposing forces applied to opposing surfaces of the housing body;

an accelerometer disposed within the housing body, the accelerometer being configured to provide an accelerometer signal conveying information associated with a position and/or a change in position of the handheld computing platform; and one or more hardware processors disposed within the housing body, the one or more hardware processors being configured by machine-readable instructions to control one or more aspects of operation of the handheld computing platform based on one or both of the pressure signal or the accelerometer signal;

wherein the one or more aspects of operation of the handheld computing platform include manipulation facilitated by the one or more hardware processors of a virtual object presented in a three-dimensional space (1) such that the virtual object is virtually grasped responsive to the handheld computing platform being squeezed and (2) such that a position of the virtual object is controlled through corresponding position and/or change in position of the handheld computing platform.

2. The handheld computing platform of claim 1, wherein the two opposing forces are applied to any opposing surfaces of the housing body.

3. The handheld computing platform of claim 1, wherein the pressure sensor is further configured to provide a second pressure signal conveying information associated with a second compressive pressure applied to the housing body, the second pressure signal being provided responsive to the housing body being squeezed by two opposing forces applied to a second set of opposing surfaces of the housing body.

4. The handheld computing platform of claim 1, wherein the pressure sensor comprises a stress gauge configured to facilitate measuring stress undergone by the housing body.

5. The handheld computing platform of claim 1, wherein the pressure sensor comprises a deflection configured to facilitate measuring a deflection undergone by the housing body.

6. The handheld computing platform of claim 1, wherein the compressive pressure must breach a threshold magnitude for the pressure signal to be provided.

7. The handheld computing platform of claim 1, wherein the one or more aspects of operation of the handheld computing platform further include one or more of:

input of a value;

selection from a menu;

entry of a password or a code;

interaction with a fitness program;

interaction with a rehabilitation program;

interaction with a medical treatment program; or interaction with a game.

8. The handheld computing platform of claim 7, wherein the value inputted based on the pressure signal is an analog value or a digital value.

9. The handheld computing platform of claim 7, wherein entry of the password or the code based on the pressure signal is achieved by a sequence of squeezes performed on the handheld computing platform.

10. The handheld computing platform of claim 7, wherein the fitness program includes squeezing the handheld computing platform with a threshold force, for a threshold duration of time, and/or for a number of repetitions.

11. The handheld computing platform of claim 1, wherein the one or more processors are further configured by machine-readable instructions to receive multiple contemporaneous pressure signals provided by the pressure sensor and interpret the multiple contemporaneous pressure signals to control one or more aspects of operation of the handheld computing platform.

12. The handheld computing platform of claim 1, wherein the one or more processors are further configured by machine-readable instructions interpret the pressure signal to control one or more aspects of operation of the handheld computing platform based on a position on the handheld computing platform on which the opposing forces were applied.

13. The handheld computing platform of claim 12, wherein the one or more processors are further configured by machine-readable instructions to quantify the compressive pressure applied to the housing body on an arbitrary scale.

14. The handheld computing platform of claim 12, wherein the one or more processors are further configured by machine-readable instructions to quantify the compressive pressure applied to the housing body in absolute units.

15. The handheld computing platform of claim 1, wherein the handheld computing platform is configured to be removably coupled with an accessory, the accessory being configured to facilitate squeezing the housing body by two opposing forces applied to opposing surfaces of the housing body.

16. The handheld computing platform of claim 1, wherein the one or more processors are further configured by machine-readable instructions quantify the compressive pressure applied to the housing body.

17. A method of facilitating receipt of user input using a handheld computing platform with an integrated pressure sensor, the method comprising:
receiving, using one or more processors, a pressure signal conveying information associated with a compressive pressure applied to a housing body of the handheld computing platform, the pressure signal being provided by a pressure sensor disposed within the housing body, the pressure signal being provided responsive to the housing body being squeezed by two opposing forces applied to opposing surfaces of the housing body;
receiving, using one or more hardware processors, an accelerometer signal conveying information associated with a position and/or a change in position of the handheld computing platform, the accelerometer signal being provided by an accelerometer disposed within the housing body; and
controlling, using one or more hardware processors, one or more aspects of operation of the handheld computing platform based on one or both of the pressure signal or the accelerometer signal;
wherein the one or more aspects of operation of the handheld computing platform include manipulation facilitated by one or more hardware processors of a virtual object presented in a three-dimensional space (1) such that the virtual object is virtually grasped responsive to the handheld computing platform being squeezed and (2) such that a position of the virtual object is controlled through corresponding position and/or change in position of the handheld computing platform.

18. The method of claim 17, wherein the one or more aspects of operation of the handheld computing platform further include one or more of:
input of a value;
selection from a menu;
entry of a password or a code;
interaction with a fitness program;
interaction with a rehabilitation program;
interaction with a medical treatment program; or
interaction with a game.

19. The method of claim 17, further comprising quantifying the compressive pressure applied to the housing body.

20. An apparatus having an integrated pressure sensor for facilitating user input involving variable forces and/or positions on which forces are applied, the apparatus comprising:
a housing body configured to house a portion of a handheld computing platform;
a pressure sensor integrated within the housing body, the pressure sensor being configured to provide a first signal conveying information associated with a first force applied to the housing body; and
an accelerometer disposed within the housing body, the accelerometer being configured to provide an accelerometer signal conveying information associated with a position and/or a change in position of the handheld computing platform;
wherein the pressure sensor is configured to be communicatively coupled with one or more hardware processors, the one or more hardware processors being configured to interpret the signal provided by the pressure sensor to determine user input based on one or both of (1) a magnitude of the first force or (2) a position on the housing body on which the first force was applied;
wherein the user input controls one or more aspects of operation of the handheld computing platform; and
wherein the one or more aspects of operation of the handheld computing platform include manipulation facilitated by the one or more hardware processors of a virtual object presented in a three-dimensional space (1) such that the virtual object is virtually grasped responsive to the handheld computing platform being squeezed and (2) such that a position of the virtual object is controlled through corresponding position and/or change in position of the handheld computing platform.

21. The apparatus of claim 20, wherein the one or more aspects of operation of the handheld computing platform further include one or more of input of a value, selection from a menu, entry of a password or a code, interaction with a fitness program, interaction with a rehabilitation program, interaction with a medical treatment program, or interaction with a game.

22. The apparatus of claim 20, wherein the pressure sensor is further configured to provide a second signal conveying information associated with a second force applied to the housing body, the second force being applied contemporaneously with the first force.

23. The apparatus of claim 22, wherein the one or more processors are further configured to interpret the signal provided by the pressure sensor to determine the user input based on one or both of (1) a magnitude of the second force or (2) a position on the housing body on which the second force was applied.

24. A handheld computing platform with an integrated pressure sensor to facilitate receipt of user input, the handheld computing platform comprising:
- a housing body configured to house components of the handheld computing platform;
- a pressure sensor disposed within the housing body, the pressure sensor being configured to provide a pressure signal conveying information associated with a compressive pressure applied to the housing body, the pressure signal being provided responsive to the housing body being squeezed by two opposing forces applied to opposing surfaces of the housing body;
- an accelerometer disposed within the housing body, the accelerometer being configured to provide an accelerometer signal conveying information associated with a position and/or a change in position of the handheld computing platform; and
- one or more hardware processors disposed within the housing body, the one or more hardware processors being configured by machine-readable instructions to control one or more aspects of operation of the handheld computing platform based on one or both of the pressure signal or the accelerometer signal;
- wherein the one or more aspects of operation of the handheld computing platform include manipulation facilitated by the one or more hardware processors of a menu digitally displayed by the handheld computing platform such that (1) scrolling through the menu and (2) selecting items from the menu are controlled based on the pressure signal.

* * * * *